United States Patent

[11] 3,541,989

[72] Inventor Willie Burt Leonard
 1922 W. Gray, Houston, Texas 77003
[21] Appl. No. 710,003
[22] Filed March 4, 1968
[45] Patented Nov. 24, 1970

[54] HYDROPNEUMATIC MEASUREMENT AND CONTROL FROM BUOYED BODIES
 17 Claims, 8 Drawing Figs.
[52] U.S. Cl. ........................... 114/235;
 73/439; 114/16
[51] Int. Cl. ........................... B63b 21/00;
 G01n 9/00, B63g 8/14
[50] Field of Search ........................... 114/235,
 235.2, 16, 16.3; 73/439

[56] References Cited
UNITED STATES PATENTS
2,736,238 2/1956 Moncrief ............... 90/1
2,773,426 12/1956 Fowler et al. ........... 90/1
2,833,434 5/1958 Stover et al. ........... 214/1—X
2,834,258 5/1958 Anderson et al. ........ 90/1
3,200,964 8/1965 Eldred ................. 214/1
3,229,585 1/1966 Deprez ................. 90/1—X
3,354,782 11/1967 Buchanan et al. ........ 90/1
3,434,446 3/1969 Cole ................. 114/235(.2)UX
3,435,797 4/1969 Chapman ............ 114/235(.2)UX Primary Examiner—Trygve M. Blix
Attorneys—Murray Robinson, Ned L. Conley, James A. Bargfrede, Robert W. B. Dickerson and Bill B. Berryhill ABSTRACT: A diaphragm motor drives a mud densitometer gauge or depth control vanes for a barge or cable. One side of diaphragm is subject to air pressure received from a hydropneumatic converter which responds to hydraulic pressure at a predetermined depth (densitometer) or at ambient depth (barge) or at controlled depth (cable).

WillieBurt Leonard
INVENTOR.

BY Murray Robinson
ATTORNEY

Patented Nov. 24, 1970

Willie Burt Leonard
INVENTOR.

BY Murray Robinson
ATTORNEY

WillieBurt Leonard
INVENTOR.

BY Murray Robinson
ATTORNEY ns
3,541,989

HYDROPNEUMATIC MEASUREMENT AND CONTROL FROM BUOYED BODIES

OUTLINE OF THE DISCLOSURE

1. Mud Densitometer

A mud densitometer includes a floating vessel. A hydropneumatic pressure converter includes a tube depending from the vessel and a hose supplying air under pressure to the vessel from a source whose pressure exceeds that expected at the bottom of the tube. A choke in the hose, of greater flow resistance than the outlet of the tube, causes pressure downstream of the choke to equal that at the tube outlet and thereby vary with the mud density. A flexible diaphragm motor drives a gage. A sensing chamber on one side of the diaphragm is connected to the air pressure downstream from the choke. A setting chamber on the other side of the diaphragm contains a spring or an elastic fluid to supply a counterpressure of fixed or adjustable modulus.

2. Submarine Barge

A submarine barge, either towed or self-propelled, includes vanes to control its depth. Vanes are mechanically positioned by movement of a flexible diaphragm motor. A sensing chamber at one side of each motor diaphragm is connected to a hydropneumatic pressure converter comprising a tube extending to a point on the outer wall of the barge. Air under pressure greater than that expected at the outlet of the tube is supplied to the chamber through a choke. The choke has greater flow resistance than the tube outlet so that the pressure in the chamber is equal to the hydrostatic pressure at the tube outlet. A setting chamber at the other side of each motor diaphragm is supplied with air at controlled pressure which can be changed to vary the depth of the barge. Use of sensing chambers with tubes at points dispersed over barge enables barge to be kept level. Use of air on both sides of diaphragm motor aids buoyancy and eliminates variation in buoyancy.

3. Depth Controller

A towed cable is kept level beneath the water by a plurality of depth controllers, each releasably connected to the cable. Each controller includes diving vanes driven by a flexible diaphragm motor. Since the motor is smaller than for barge diving vanes, buoyancy of the air in the sensing chamber is not required and slightly variable buoyancy due to motion of the diaphragm is immaterial. Therefore the sensing chamber is directly exposed to the liquid in which the cable is immersed rather than through a hydropneumatic converter. However instead of a hose to supply air at adjustable pressure to the setting chamber a hydropneumatic pressure converter comprising an air bladder is connected by a hose to the setting chamber. The air bladder is disposed in a housing open to hydrostatic pressure. For all the controllers except perhaps for the leading controller, the air bladder may be connected to the cable a distance in advance of the vanes, e.g. next to the vanes immediately adjacent to and in front of the vanes controlled by the air bladder. Each controller connected to the cable acts to keep the part of the cable adjacent its sensing chamber at the same level as that corresponding to, the hydrostatic pressure at its air bladder, thereby maintaining the cable level at the depth of the leading controller.

The air bladder for the leading depth controller may be suspended by an adjustable length line from a float. Alternatively the air bladder housing is connected to the external hydrostatic pressure through an electric valve. Then the pressure in the air bladder is adjusted by opening the valve when the bladder is at the desired depth and then reclosing the valve. The bladder is brought to the desired depth by solenoids actuating the vanes when the valve is open.

To prevent wide fluctuation in the depth of the cable one or more of the controllers, e.g. every fifth one of the following controllers, may be provided with absolute depth range control means comprising a spring loaded diaphragm motor subject to the hydrostatic pressure adjacent the vanes of the controller and connected to the vanes by a lost motion connection.

Instead of an air bladder, each hydropneumatic pressure converter may comprise a cylinder and free piston, the cylinder being connected to the setting chamber on one side of the piston and to the hydrostatic pressure on the other.

BACKGROUND OF THE INVENTION

1. Field of the Invention

This invention pertains to hydropneumatic measurement and control. More particularly the invention is exemplified by a densitometer for monitoring drilling mud, by a submarine barge which may carry a seismic generator, by a seismic receiver cable used in exploring for oil and gas, and by a depth controller especially adapted for controlling the depth of such a cable.

2. Description of the Prior Art

It is an elementary principle of physics that the pressure in an incompressible liquid is proportional to the density of the liquid and the depth below the surface. The principle has been applied to the measurement of the density of a flowing liquid, as disclosed for example in U.S. Pat. No. 2,394,549 issued Feb. 12, 1946 on the application of W. H. Howe. To determine density, Howe compares the pressure at the lower end of a fixed vent pipe immersed in a flowing liquid with the pressure at the lower end of a fixed vent pipe immersed in a standard liquid, the containers for the liquids being interconnected, and each pipe being connected through a restriction to a source of air of regulated pressure sufficient to cause air to flow slowly or "bubble" out of the pipe at all expected densities of the flowing liquid. Since the vent pipe in the flowing liquid is in a fixed position the air pressure depends not only on the liquid density but the liquid height, thereby necessitating the use of the second vent pipe and container for the comparison liquid.

In the drilling mud densitometer disclosed in U.S. Pat. No. 2,609,681 issued Sept. 9, 1952 on the application of W. J. Bielstein the movable wall of a water container is subjected to the hydrostatic pressure of drilling mud at a known depth in an adjacent container and the resultant rise and fall of water in the water container is measured with a fixed bubble pipe to indicate the density of the mud. Since there is no restriction ahead of the bubble pipe, the air flow must be adjustable to be made just sufficient to cause air flow. Because the bubble pipe is fixed the air pressure is proportional to both height and density of the liquid, thereby necessitating the use of two containers.

The bubble pipe method of measuring pressure has also been applied to a depth controller as illustrated by U.S. Pat. No. 2,751,703 issued June 26, 1956 on the application of Kietz et al. In the Kietz et al. construction, the pressure corresponding to the depth of a towed fishing net, as determined from bubble pipe measurement, is used to control the depth of the net. However the pressure is not used to drive a diaphragm motor to drive diving vanes but instead is connected to a gage whose pointer is one element of an electric switch controlling the inflation of a balloon governing the buoyancy of the net.

A hydropneumatic pressure converter of the movable wall pneumatic chamber type has been used in a depth controller to supply counterpressure to one side of a bellows motor driving diving vanes, the other side being subjected to hydrostatic pressure at the level of a towed submarine. This is shown in U.S. Pat. No. 2,928,367 issued Mar. 15, 1966 on the application of J. C. McCormick wherein an air bladder towed by a sled along the sea floor is connected to one side of a bellows, the other side of the bellows being exposed to hydrostatic pressure at the level of the towed submarine, the bellows being connected to diving vanes controlling the depth of the submarine. Since the setting side of the bellows is exposed to the ocean bottom pressure, the submarine is maintained a fixed distance off bottom rather than at a fixed depth below the surface.

The use of a spring to supply a set force on a bellows subjected directly to hydrostatic pressure, the bellows controlling electric means operating diving vanes to maintain a net a predetermined depth below the surface is disclosed by U.S. Pat. No. 2,729,910 issued Jan. 10, 1956 on the application of R. A. Fryklund. The spring is not adjustable from the surface; instead, depth of the net is adjusted by surface electrical means interposed between the bellows and diving vanes.

Other hydropneumatic measurement and control devices are known in the prior art but they too differ from the subject invention as will appear hereinafter.

SUMMARY OF THE INVENTION

According to the invention the hydrostatic pressure at a selected point of a buoyed body is supplied to a sensing chamber on one side of a flexible diaphragm motor. A setting chamber on the other side of the flexible diaphragm is supplied with a pressure (p) that has a predetermined modulus or ratio of change of pressure with change of position (x) of the diaphragm. The modulus may be zero, constant, or variable. Stated algebraically, the pressure (p) equals $af(x)+b$ where a and b are constants, either of which may be zero, and usually $f(x)=x$. The setting pressure is adjusted as desired. The diaphragm motor drives an indicator measuring the pressure differential to indicate the liquid density or drives a diving vane to control the depth of the buoyed body. The pressure in either the sensing or setting chamber is the air pressure from a hydropneumatic converter supplying air pressure proportional to a hydrostatic pressure.

For a detailed description of the invention reference will be made to the accompanying drawings.

DESCRIPTION OF PREFERRED EMBODIMENTS

1. Mud Densitometer

Figure 1:
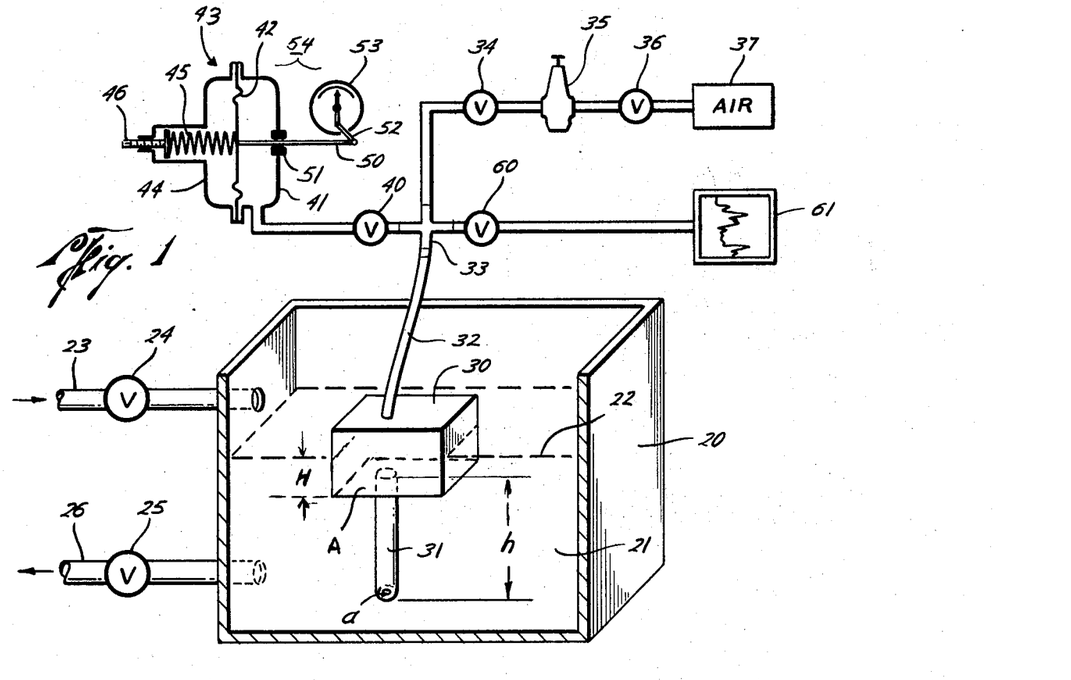
FIG. 1 is a semischematic view of a mud densitometer embodying the invention.

Referring now to FIG. 1, there is shown a tank 20 containing a liquid, namely, drilling mud 21, the level of the mud being indicated at 22. Mud flows into the tank through pipe 23 and valve 24. Mud flows out of the tank through valve 25 and pipe 26.

Floating on the mud is a hollow vessel 30. Extending downwardly from the vessel is a tube 31. Connected to the top of the vessel is a flexible hose 32. Hose 32 is connected through a pipe cross 33, adjustable choke valve 34, regulator 35 and shutoff valve 36 to a source 37 of air under pressure, such as a compressor.

Another branch of cross 33 is connected through shutoff valve 40 to sensing chamber 41 at one side of flexible diaphragm 42 of motor 43. The setting chamber 44 at the other side of the diaphragm contains a helical spring 45, one end of which is connected to diaphragm 42. The position of the other end of spring 45 is adjustable by means of screw plug 46.

Diaphragm 42 of motor 44 is connected to link 50 which passes through seal 51 to connect pivotally to the end of pointer 52. The pointer is pivotally mounted to a graduated scale 53 over which it moves to indicate the pressure existing in cross 33. Motor 43 and the connected linkage and scale provide a pressure gage 54.

The other branch of cross 33 is connected through shutoff valve 60 to pressure recorder 61.

In operation, the regulator 35 is adjusted so that its output pressure is a little greater than any expected mud pressure at the lower end of tube 31. Choke 34 is adjusted to present a higher flow resistance than tube 31. Air will then bubble slowly out of tube 31 and the pressure in cross 33 will be substantially that at the lower end of tube 31. The system comprising the air supply 35, 36, 37, the choke 34, cross 33, hose 32, vessel 30 and tube 31, thus functions as a hydropneumatic pressure converter, the hydrostatic pressure at the lower end of tube 31 being converted to a substantially equal pneumatic pressure in cross 33.

Diaphragm motor 43 gives an indication at each instant of the pressure in cross 33 and recorder 61 make a record of the pressure as it varies with time. As will appear from the following, the pressure in cross 33 is a measure of the density of mud 21 so that gage 54 and recorder 61 can be graduated to read directly in density.

To show that the pressure in cross 33 is a measure of the density of mud 21, let W = weight of vessel 30 (including tube 31), it being assumed that any portion of the weight of hose 32 supported by vessel 30 has been made negligible.

h = length of tube 31
H = submergence of vessel 30 in mud 21
a = horizontal cross-sectional area of tube 31
A = horizontal cross-sectional area of vessel 30
p = mud pressure at lower end of tube 31
d = density of mud 21

Then, since the weight of a floating body is equal to the weight of the water displaced, $$W = (H_A + ha)d \qquad (1)$$

Also since the pressure beneath the surface of the liquid equals the depth times the density, $$p = (H+h)d \qquad (2)$$

Combining (1) and (2) we have $$\left(p - \frac{W}{A}\right) = \left(1 - \frac{a}{A}\right)hd \qquad (3)$$

Since W, A a, and h are constants, it is apparent that the mud density d plotted against the pressure p at the lower end of tube 31 is a straight line, or stated algebraically, d is a linear function of p.

If h, the length of tube 31, is increased, then for any given density d the pressure p increases. By lengthening h, p can be made large compared to the quantity W/A, so that the straight line graph of d versus p will pass substantially through the origin. By making the diameter of tube 31 small compared to the cross-sectional area of the vessel 30, the factor a/A is made small, and this produces the same effect as increasing h. The same result is achieved by making W/A small, that is, by making vessel 30 of light weight and large cross-sectional area.

It is contemplated that a/A will be less than 25 percent, that h will be at least $1/2(A)^{1/2}$, and that W/A will be less than one p.s.i.

2. Underwater Barge

Figure 2:
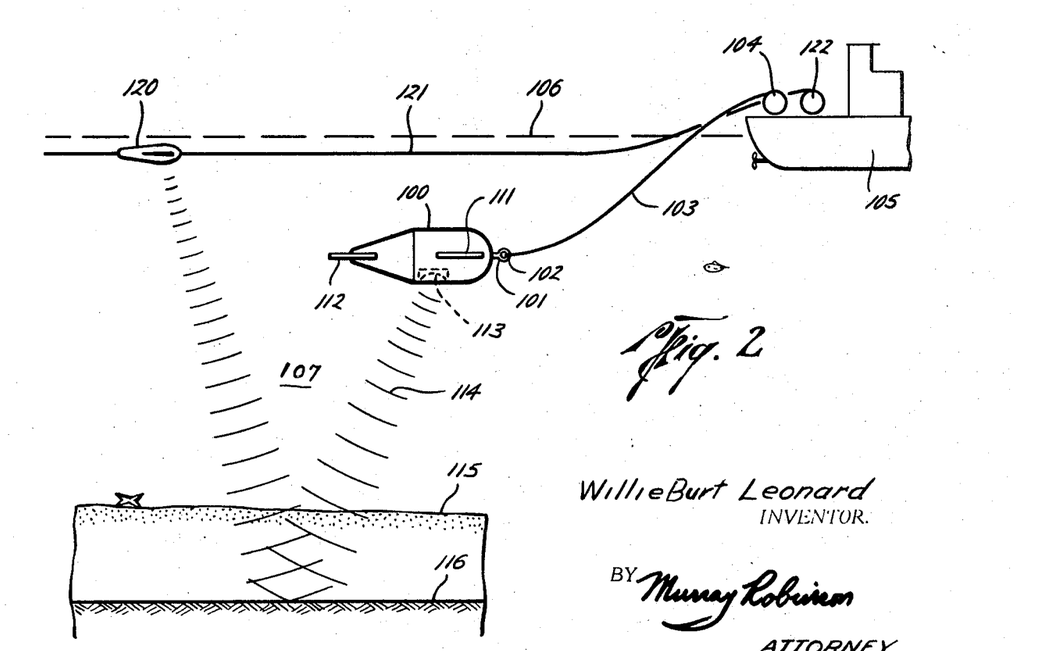
FIG. 2 is a schematic view of a tug boat towing a submarine barge and submarine cable in accordance with the invention.
Figure 3:
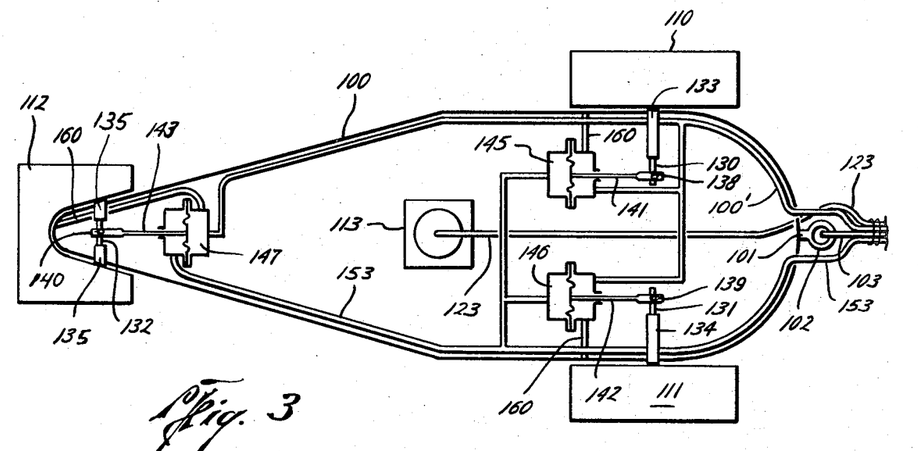
FIG. 3 is a horizontal section through the barge of FIG. 2.

Referring now to FIG. 2 there is shown a hollow vessel 100, which may be an underwater barge or other type of submarine. The vessel 100 preferably has a streamline shape. It is provided at its forward end with a bar 101 having an eye 102 providing means to connect the vessel to one end of tow line 103. The other end of the tow line is wound on reel 104 carried by tug boat 105. Referring now also to FIG. 3, the vessel is maintained at a desired depth below the surface 106 of water 107 by fore-and-aft diving vanes 110, 111, 112. The vessel 100 may be provided with a generator 113 of seismic waves 114. The seismic waves are adapted to penetrate the earth's surface 115 at the bottom of the water 107 and be reflected back from discontinuities representing the interfaces between different earth formations, such as interface 116. The reflected energy may be picked up by suitable receivers 120 towed by cable 121 unwound from reel 122 carried on tugboat 105. Seismic generator 113 is connected by electric cable 123 to any suitable control and power supply means on the tugboat 105.

Figure 4:
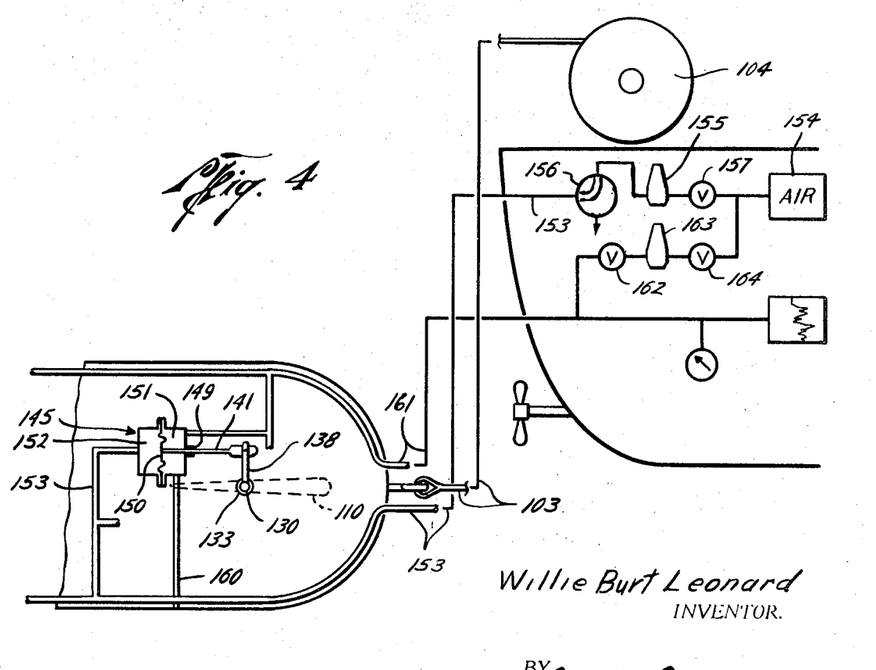
FIG. 4 is a fragmentary vertical section through a tug boat and barge of FIG. 2.

Referring now particularly to FIG. 3, and also to FIG. 4, diving vanes 110, 111, 112 are affixed to shafts 130, 131, 132 which are rotatably mounted in bearings 133, 134, 135. Extending upwardly from and affixed to the shafts are crank arms 138, 139, 140. The free ends of the arms are pivotally connected to drive rods 141, 142, 143, of diaphragm motors 145, 146, 147.

Referring now particularly to FIG. 4, each of the diaphragm motors 145, 146, 147, includes a flexible diaphragm 150 in a fluid tight housing providing a sensing chamber 151 on one side and a setting chamber 152 on the other.

The drive rod, e.g. 141, passes through sliding seal 149 in the wall of the sensing chamber. If desired, the drive rods could pass out of the motor through the setting chamber. The setting chamber is connected by hose 153 to a source 154 of air under pressure, e.g. a compressor. Adjustable regulator 155 maintains the pressure at a desired value corresponding to the hydrostatic pressure at the depth at which the vessel 100 is to be towed. Suitable vent and shut off valves 156, 157 are provided in hose 153 on opposite sides of regulator 155 whereby the setting chamber 152 can be vented to atmosphere whenever desired.

Each sensing chamber 151 is connected by a pipe 160 to a port in the hull of vessel 100, the ports lying in a plane which it is desired to maintain level at the depth for which the setting chamber pressure is adjusted. Each sensing chamber is also connected by hose 161 to the source 154 of air under pressure. In the hose connection line are choke valve 162, pressure regulator 163, and cut off valve 164. Choke 162 is adjusted to present greater resistance to air flow than pipe 160. Regulator 163 is set to supply air to the sensing chambers at a pressure slightly higher than the highest hydrostatic pressure expected at pipes 160 during operation, so that air constantly slowly bubbles out of pipes 160. There is thus provided a hydropneumatic pressure converter similar to that shown in FIG. 1, whereby the air pressure in each sensing chamber substantially equals that at the outer ends of pipes 160 where they join the hull of vessel 100. If the pressure in any of the sensing chambers departs from equality with the pressure in the setting chambers, the corresponding diaphragm, e.g. 150, moves to activate the one of the diving vanes connected thereto so as to raise, lower, or trim the vessel and bring the plane defined by the ports at the ends of tubes 160 back to the desired depth below the surface.

It is to be observed that since not only the setting but also the sensing chamber of each motor 145, 146, 147, is filled with air, rather than water, as would be the case if a hydropneumatic converter were not used, the buoyancy of the vessel 100 is increased, whereby a smaller vessel can be used for any given load. Furthermore, the buoyancy is not affected by diaphragm movement as would be the case if one chamber were filled with water and the other with air. The overall buoyancy of the vessel 100 can be positive, negative, or zero, because the desired depth is achieved by the force exerted by the diving vanes. Since the tow cable exerts an upward as well as forward force on the vessel, the equilibrium position of the diving vanes would be such as to exert a downward force if the vessel were of zero buoyancy. Preferably the vessel has a slightly positive buoyancy so that it will come to the surface when not being towed.

3. Submarine Cable a. Primary Depth Controller

Figures 5, 6:
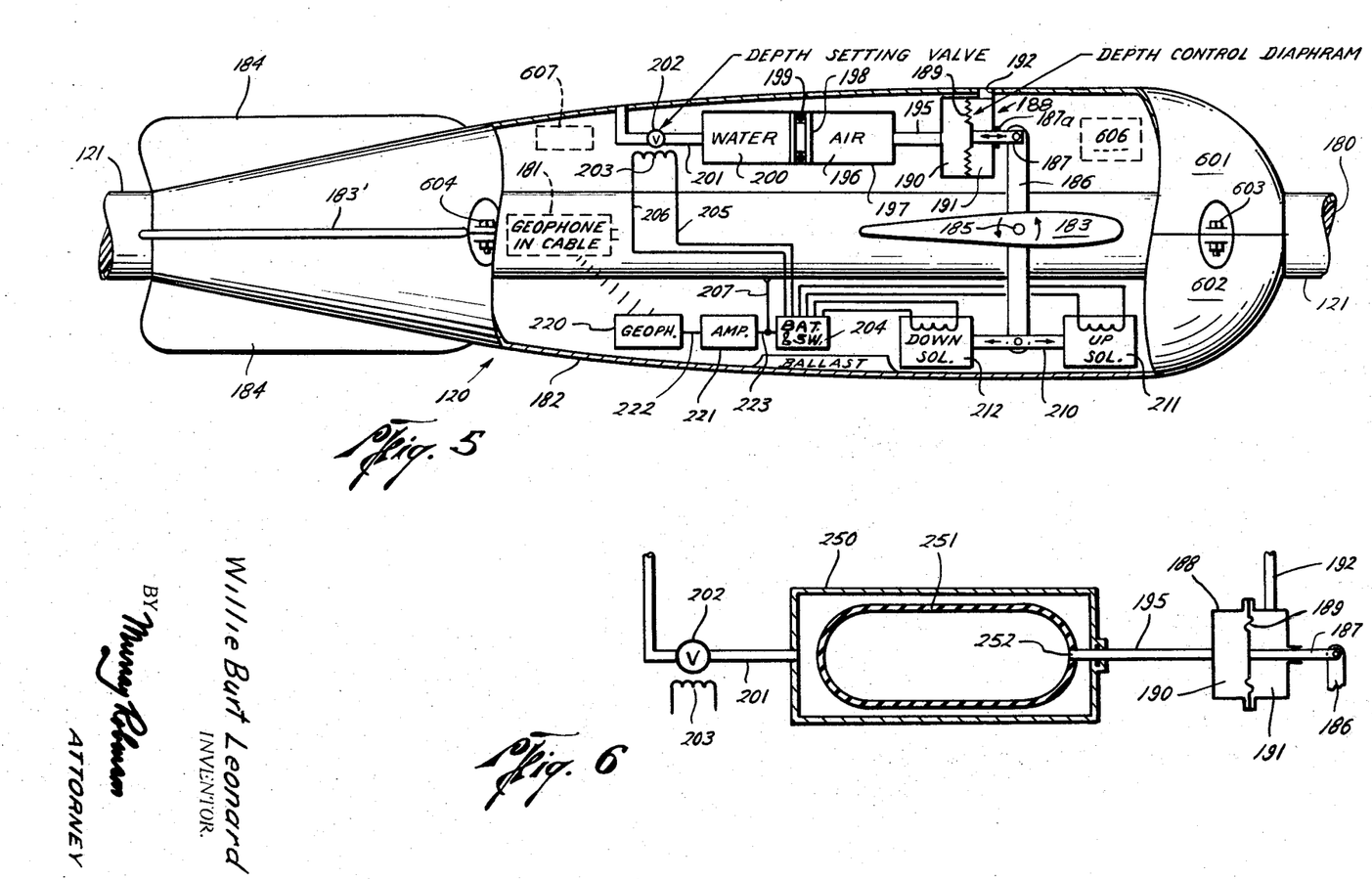
FIG. 5 is a side elevation, partly broken away, illustrating a portion of a submarine cable in accordance with the invention.
FIG. 6 shows a modification of a portion of the apparatus shown in FIG. 5.

Referring now to FIG. 5, there is shown to a larger scale the seismic receiver 120 towed by cable 121 referred to previously in connection with FIG. 2. The cable 121 may be of the known construction including an outer waterproof sheath 180 protecting electric conductors leading to geophones 181. Surrounding cable 121 is a hollow vessel 182 of streamlined shape. Fixed attitude horizontal and vertical stabilizer fins 181', 184 are provided at the aft end of vessel 182. Port and starboard diving vanes 183 are affixed to the ends of shaft 185 at the sides of the vessel. Shaft 185 extends through sealed openings in the vessel and is mounted in bearings similar to the bearings 135 of the FIG. 3 construction. Crossarm 186 is affixed to shaft 185.

The upper end of arm 186 is pivotally connected to drive rod 187 of diaphragm motor 188. Motor 188 includes a flexible diaphragm 189 mounted in a fluid tight housing providing a setting chamber 190 on one side of the diaphragm and a sensing chamber 191 on the other side of the diaphragm. A sliding contact seal 187A is provided around drive rod 187 where it enters chamber 191. A pipe 192 connects the sensing chamber to a port in the hull of vessel 182 whereby the sensing chamber fills with the water in which the vessel is immersed.

The setting chamber 190 is connected by pipe 195 to a movable wall air chamber 196 comprising a cylinder 197 and a free piston 198. There is a seal ring 199 around piston 198. The chamber 200 in cylinder 197 at the side of piston 198 opposite from chamber 196 is connected by pipe 201 through valve 202 to a port in the hull of vessel 182. Valve 202 is driven by electric motor or solenoid 203 sometimes hereinafter called an electromotive means, from electric power supply 204 to which it is connected by electric conductors 205, 206. Power supply 204 includes a battery and relays to open and close the connections to the battery as desired. The relays may be controlled by electric conductors 207 which enter cable sheath 180 and extend back to suitable means (not shown) on tug boat 105.

The lower end of arm 186 is pivotally connected to drive rod 210. The ends of rod 210 form the cores of the solenoid motors or electromotive means 211, 212 which are also connected to power supply 204. Other types of electric motors could be used. The relays in power supply 204 also control the connection of the solenoids 211, 212 to the battery in the power supply.

If desired the solenoids 203, 211, 212, can be located inside the cable sheath 180 and act on permanent magnets or magnetic material outside the sheath connected directly or indirectly to the valve and diving vanes. This would be the preferable construction for control of new cable. For existing cable, the construction illustrated is suitable.

If desired, the actuation of the relays in power supply 204, both for control of valve 202 and diving vanes 183 may be effected by using geophone 181 as a transmitter and sending from it signals to be picked up by geophone 220 located in the hull of vessel 182. The signals received by geophone 220 are sent to amplifier 221 through conductors 222 and thence through conductors 223 to the relays in power supply 204.

In operation, with valve 202 open, the solenoids 211, 212 are actuated to bring the towed vessel 182 to the desired depth. The solenoids move the diving vanes 183 to a position to maintain equilibrium between the upward component of the force exerted by cable 12, the downward force of gravity on cable 121 and vessel 182, and the upward force of water pressure on the vessel 182 and cable 121. The cable 121 and vessel 182 may have positive, negative, or zero buoyancy as desired.

The actual depth of the vessel 182 can be determined in any suitable manner, for example by means of a hydrostatic pressure gage (not shown) mounted in the vessel and transmitting its indications through conductors inside cable sheath 180 back to the two boat 105.

With valve 202 open, when vessel 182 dives beneath the surface of the water, chamber 200 fills with water. The hydrostatic pressure in chamber 200 thus equals that existing at the depth of the vessel. The movement of free piston 198 causes the pressure in chamber 196 to equal that in chamber 200. The cylinder 197 and piston 198 thus provide a hydropneumatic pressure converter. When the vessel 182 reaches the desired depth, valve 202 is closed and the pressure in chamber 196 is thereby set equal to the hydrostatic pressure at the desired depth.

The operation of solenoids 211, 212 is then discontinued and diaphragm motor 188 takes over actuation of diving vanes 183. If the vessel 182 sinks too low, the hydrostatic pressure in sensing chamber 191 exceeds the pneumatic pressure in setting chamber 190 and the diaphragm moves the diving vanes clockwise, thereby causing the vessel to rise until diaphragm equilibrium is achieved at the desired depth. If the vessel rises above the desired depth, the hydrostatic pressure in sensing chamber 191 becomes less than the pneumatic pressure in setting chamber 190 and the diaphragm moves the diving vanes counterclockwise. This causes the vessel to sink until equilibrium is reached when the vessel is at the desired depth.

If it is desired to change the depth of the vessel, valve 202 is opened and solenoid 211 or 212 or both may be actuated to bring the vessel to the desired depth. It is to be noted that with neither solenoid 211 nor 212 energized, the diving vanes 183 will automatically return to the neutral position shown in the drawing due to the force of the water through which the vessel is being towed. When the vessel is at the desired new depth, the valve 203 is closed, solenoids 211, 212 are deenergized, and diaphragm motor 188 automatically maintains the vessel 182 at the desired depth.

To minimize the work of the diaphragm motor and diving vanes, the cable 121 and vessel 182 preferably have a substantially zero buoyancy. The vertical stabilizers 183' may be given sufficient tilt to neutralize whatever positive or negative buoyancy exists; the stabilizer attitude or tilt may be adjusted to the intended speed of tow of the vessel to dive the cable to a depth balancing cable lift.

Referring now to FIG. 6 there is shown a portion of the FIG. 5 construction modified to substitute a different form of hydropneumatic pressure converter. In this construction the cylinder 197 and piston 198 of the FIG. 5 construction are replaced by a fluid tight housing 250 within which is disposed a flexible, preferably elastic, air bladder 251. Bladder 251 may be made of an elastomer, such as rubber, for example. The bladder is closed except for a neck 252 which is connected to pipe 195 leading to the setting chamber of diaphragm motor 188. Housing 250 is closed except where connected to pipe 201 leading through valve 202 to the exterior port in the vessel hull.

The operation of the FIG. 6 construction embodiment is the same as that of the FIG. 5 construction. With valve 202 open the vessel 182 is brought to the desired depth by means of the solenoids 211, 212. Then valve 202 is closed. The hydrostatic pressure outside the bladder equals the air pressure inside the bladder and both are equal to the hydrostatic pressure at the desired depth. The diaphragm 189 then actuates the vanes 183 to keep the vessel at the desired depth, since only at that depth does the hydrostatic pressure in the sensing chamber 191 equal the pneumatic pressure in the setting chamber.

In both the FIG. 5 and FIG. 6 constructions the volume of air in the hydropneumatic converter is preferably quite large compared to the change of volume effected by movement of the diaphragm of the motor 188, so that the pressure in the setting chamber is not materially changed by diaphragm motion. However if desired, the volume of the converter air space could be made comparable to the displacement of the diaphragm, in which case the air would act like a spring, having a pressure varying with the displacement of the diaphragm. In the latter case although the vessel could achieve equilibrium at depths departing somewhat from the initially set depth, the control action would be more gradual and less apt to hunt.

b. Secondary Depth Controller

Figure 7:
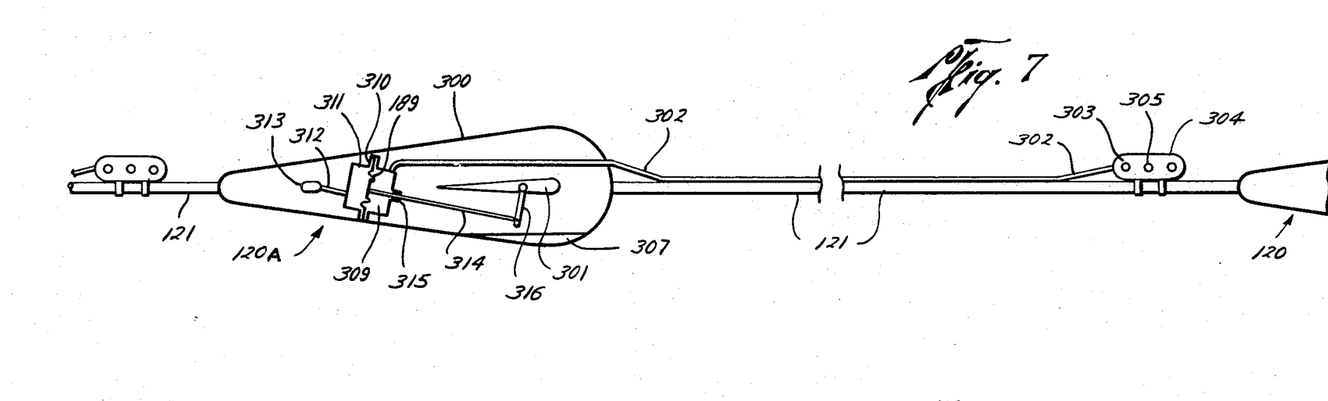
FIG. 7 is a side elevation, partly in section, illustrating a portion of a submarine cable in accordance with another aspect of the invention.

Referring now to FIG. 7, the cable 121 will usually tow a plurality of seismic receivers 121 following the lead receiver 120. The lead receiver can be maintained at the desired depth by the means shown in FIG. 5 or 6, or it can be suspended from a float by an adjustable length cable, or other suitable means can be used. The follower receivers 120A can then be maintained at the same depth as the lead receiver by secondary depth control means as shown in FIG. 7.

The receivers 120A are housed in vessels 300 the same as vessel 182 and the diving vanes 301 actuated by a diaphragm motor the same as motor 188. The setting chamber of the motor however, is connected by a long flexible hose 302 to a hydropneumatic converter 303 affixed to a part of the cable 121 well forward of vessel 300, preferably close to the receiver next in front, e.g. receiver 120.

Converter 303 may be of the same type as shown in FIG. 6, except that the housing 304 is permanently open to the exterior through ports 305, the pipe 201 and valve 202 of the FIG. 6 construction being omitted. Since receiver 120 is automatically maintained at the desired depth, converter 203 supplies the setting chamber 309 of the diaphragm motor 310 in vessel 300 with an air pressure equal to the hydrostatic pressure at the desired depth. The sensing chamber 311 of the motor, as in the FIG. 6 construction, is connected by a pipe 312 to a port 313 in the hull of vessel 300. The motor therefore actuates vanes 301 through drive rod 314 passing through seal 315 and connected to arm 316 to keep vessel 300 at the desired depth.

Ballast 307 may be employed in the bottom of vessel 300 (and also in vessels 182 and 100 if desired) to maintain the vessel horizontal. Horizontal and vertical stabilizers like those of the FIG. 5 construction can also be employed.

If desired, separate port and starboard motors and sensing chambers can be used to drive separate port and starboard diving vanes to maintain the diving vane (183, 301) area horizontal. Separate fore-and-aft diving vanes could also be used to keep the cable level, in FIG. 5 and 7.

The system shown in FIG. 7 provides a secondary or relative depth controller, the depth of receiver 120A being kept equal to that of receiver 120. Other receivers 120A following the first one can be provided with similar relative depth controllers. At intervals in long string of receivers, another primary depth controller may be employed, e.g. as for receiver 120.

c. Depth Range Controller

If desired one or more of the follower receivers 120A may be provided not only with a secondary or relative depth controller but also with an absolute depth range controller. Such a construction is illustrated schematically in FIG. 8. Parts of the construction shown in FIG. 8 are the same as those of FIG. 7 and bear like reference numbers.

Figure 8:
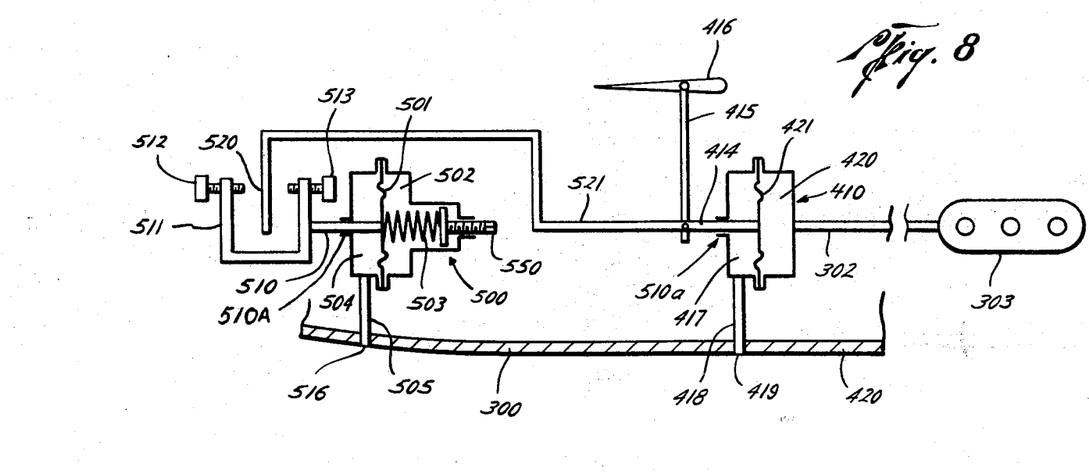
FIG. 8 is a schematic view illustrating a modification of a portion of the apparatus shown in FIG. 7.

The construction shown in FIG. 8 includes hydropneumatic converter 303, hose connecter 302, and diaphragm motor 410. The drive rod 414 of the motor is connected through arm 415 to diving vanes 416. Water is admitted to the sensing chamber 417 of the motor through pipe 418 connected to port 419 in the hull 420 of the vessel whose depth is being controlled. When the hydrostatic pressure in setting chamber 417 exceeds the pneumatic pressure in setting chamber 420 connected to converter 303 by hose 302, the diaphragm 421 moves to the right. Such motion turns vanes 416 counterclockwise causing the vessel to rise until the motor pressures balance. If pressure at 303 drops, the reverse occurs.

In case the setting pressure received from converter 303 departs too much from the pressure corresponding to the desired depth, a depth range limiting means connected to drive rod 414 comes into action. Such depth range limiting means includes diaphragm motor 500 having a flexible diaphragm 501. A setting chamber 502 at one side of the diaphragm includes a helical spring 503 connected at one end to the diaphragm and at the other end to the chamber wall so as to resiliently resist diaphragm movement in either direction. A sensing chamber 504 at the other side of the diaphragm is connected by pipe 505 to a port 506 in hull 420.

A drive rod 510 passes through a sliding seal 510A in the wall of chamber 504. Yoke 511 carried at the end of drive rod 510 is provided with adjustable stops 512, 513 in the two arms of the yoke. Pin 520 disposed between stops 512, 513, is carried by extension 521 of drive rod 414. Pin 520 and stops 512, 513 provide a lost motion connection of adjustable length and position of travel. Whenever the vessel sinks too low or rises too high, motor 500 takes up the slack or travel in the lost motion connection and moves the diving vanes to return the vessel to the preset range determined by stops 512, 513 and the setting of spring 503.

The pressure of spring 503 against diaphragm 501 may be adjusted by means of screw plug 550 similar to the adjustment of spring 45 by plug 46 in the FIG. 1 construction.

4. Hull and Motor Construction

The vessels 182 and 300 are releasably mounted on the cable whose depth they control so that they can be removed when the cable is reeled in onto the tow vessel. To this end the vessel 182 (see FIG. 5) is made in two halves, top and bottom, 601, 602, bolted together at 603, 604. A similar construction may be used for vessel 300. These vessels need not be fluid tight, instead flotation bodies such as 606, 607, may be used. The flotation bodies may be cork, polyfoam, air filled cans, or the like. Similar construction may be used for the vessels 30 and 100 if desired, thereby eliminating the need for seals where shafts and tubes intersect the hull of the vessel. It is also to be noted that where a solid elastic, e.g. a spring, is used at the setting side of the diaphragm motor, no fluid tight chamber is needed on the setting side, only a support to take the reaction of the end of the spring opposite the diaphragm, the space between the support and diaphragm defining in this case what may be called an open chamber. If the drive rod of the motor lies on the setting side of the diaphragm and an open setting chamber is used there is no need for a seal for the drive rod.

While preferred embodiments of the invention have been shown and described, many modifications thereof can be made by one skilled in the art without departing from the spirit of the invention.

I claim:

1. Fluid pressure responsive apparatus comprising:
   a buoyed vessel in a liquid;
   a diaphragm motor, said motor including a flexible diaphragm, a sensing chamber at one side of the diaphragm, a setting chamber at the other side of the diaphragm, and a drive rod connected to the diaphragm;
   a hydropneumatic converter means supplying air to one of said chambers at a pressure equal to a hydrostatic pressure to which said converter is exposed;
   opposition means in the other of said chambers to supply a force acting in opposition to the air pressure supplied by said converter means;
   the force acting against said diaphragm in said setting chamber being constant except to the extent it is a predetermined linear function (p) of the diaphragm displacement (x) selected from the group of functions including (p) equals (ax+b) where (a) and (b) are constants one of which may be zero;
   the pressure in said sensing chamber being a function of the hydrostatic pressure at a member affixed to said buoyed vessel; and
   said motor actuating said drive rod in response to said hydrostatic pressure at said member affixed to said buoyed vessel.

2. Combination of claim 1 wherein:
   said member affixed to said vessel is a tube open at one end to the liquid buoying said vessel; and
   said converter includes means to supply air to said tube at a pressure slightly higher than the hydrostatic pressure at said open end of said tube through a choke presenting a greater resistance to flow than said tube.

3. Combination of claim 2 wherein:
   said buoyed vessel has a positive buoyancy;
   said tube extends downwardly from said vessel and is open to said liquid at its lower end;
   said hydropneumatic converter means supplies air to the sensing chamber;
   said opposition means supplies to said setting chamber said force that is a function (p) equal to (ax+b); and including indicator means connected to said drive rod calibrated to indicate the density of the liquid in which the vessel is buoyed.

4. Combination of claim 3 wherein the diameter (a) of the tube and the length (h) of the tube and the horizontal cross section (A) of the vessel and the weight (W) of the vessel and tube are so related that (a/A) is less than 25 percent (h) equals at least $1/2\,(A)^{1/2}$, and W/A is less than one p.s.i.

5. Combination of claim 4 wherein said means to supply air to said tube includes a source of air under pressure, a choke connected to said source, and a flexible hose connected to said choke and said vessel, said vessel being hollow and closed except for its connection to said hose and said tube.

6. Combination of claim 2 wherein:
   said buoyed vessel is a submarine having a fluid tight hull;
   said motor is carried by said submarine;
   said tube extends from the setting chamber of said motor to a port in said hull;
   said opposition means supplies to said setting chamber said force that is a function (p) equals (ax+b); and
   including diving vanes carried by said vessel and connected to said drive rod and effective when said vessel is towed in said liquid to maintain said vessel at a depth where the hydrostatic pressure at said port produces through said converter a force on said diaphragm that balances the force on said diaphragm produced by said opposition means.

7. Combination of claim 6 wherein said opposition means includes a flexible hose connected at one end to a source of air at adjustable pressure and means connecting the other end of said hose to said setting chamber.

8. Combination of claim 1 wherein:
   said vessel is submersible; and
   said motor is carried by said vessel, and at least the one of said opposition and converter means that is connected to said setting chamber includes conduit means connected at one end to a source of air at adjustable pressure controlled remotely relative to said vessel and means connecting the other end of said conduit means to said setting chamber.

9. Fluid pressure responsive apparatus comprising:
   a submersible vessel adapted to be disposed in a liquid and be subjected to the buoyant action of the liquid;
   a diaphragm motor carried by said vessel, said motor including a flexible diaphragm, a sensing chamber at one side of the diaphragm, a setting chamber at the other side of the diaphragm, and a drive rod connected to the diaphragm;
   a hydropneumatic converter means supplying air to said setting chamber at a pressure equal to a hydrostatic pressure to which said converter is exposed;
   said converter means including conduit means connected at one end to a source of air at adjustable pressure which source is disposed exterior to and at a distance from said vessel and controlled remotely relative to said vessel, the other end of said conduit means being connected to said setting chamber;
   said source of air at adjustable pressure including a chamber having a movable wall, said movable wall being adapted for exposure to said liquid;
   said chamber having a movable wall being filled with air and communicating with said conduit means;
   said chamber having a movable wall being functionally separate and distinct from said diaphragm motor and said diaphragm and chambers of said motor;
   the force acting against said diaphragm in said setting chamber being constant except to the extent it is a predetermined linear function (p) of the diaphragm displacement (x) selected from the group of functions including (p) equals (ax+b) where (a) and (b) are constants one of which may be zero;
   opposition means supplying at said sensing chamber a force acting in opposition to the air pressure supplied by said converter means, said opposition means being a source of pressure that is a function of the hydrostatic pressure at a member affixed to said buoyed vessel; and said motor actuating said drive rod in response to said hydrostatic pressure at said member affixed to said buoyed vessel.

10. Combination of claim 9 including:

diving vane means carried by said vessel and connected to said drive rod and effective when said vessel is towed in said liquid to maintain said vessel at a depth having a hydrostatic pressure equal to the pressure in said setting chamber; and said hydropneumatic converter including a second chamber adjacent the movable wall of the said chamber that is inclined in said source of air at adjustable pressure and means to connect said second chamber to said liquid.

11. Fluid pressure responsive apparatus comprising:

a submersible vessel adapted to be disposed in a liquid and be subjected to the buoyant action of the liquid;

a diaphragm motor carried by said vessel, said motor including a flexible diaphragm, a sensing chamber at one side of the diaphragm, a setting chamber at the other side of the diaphragm, and a drive rod connected to the diaphragm;

a hydropneumatic converter means supplying air to said setting chamber at a pressure equal to a hydrostatic pressure to which said converter is exposed;

said converter means including conduit means connected at one end to a source of air at adjustable pressure which source is disposed exterior to and at a distance from said vessel and controlled remotely relative to said vessel, the other end of said conduit means being connected to said setting chamber;

said source of air at adjustable pressure including a chamber having a movable wall, said movable wall being adapted for exposure to said liquid;

said chamber having a movable wall being filled with air and communicating with said conduit means;

said chamber having a movable wall being functionally separate and distinct from said diaphragm motor and said diaphragm and chambers of said motor;

the force acting against said diaphragm in said setting chamber being constant except to the extent it is a predetermined linear function (p) of the diaphragm displacement (x) selected from the group of functions including (p) equals (ax+b) where (a) and (b) are constants one of which may be zero;

opposition means supplying at said sensing chamber a force acting in opposition to the air pressure supplied by said converter means, said opposition means being a source of pressure that is a function of the hydrostatic pressure at a member affixed to said buoyed vessel;

said motor actuating said drive rod in response to said hydrostatic pressure at said member affixed to said buoyed vessel;

diving vane means carried by said vessel and connected to said drive rod and effective when said vessel is towed in said liquid to maintain said vessel is towed in said liquid to maintain said vessel at a depth having a hydrostatic pressure equal to the pressure in said setting chamber;

said hydropneumatic converter including a second chamber adjacent the movable wall of the said chamber that is included in said source of air at adjustable pressure and means to connect said second chamber to said liquid;

valve means to close off said means to connect said second chamber to said liquid; and electromotive means to actuate said valve means from a remote location.

12. Combination of claim 11 including:

electromotive means to drive said diving vanes overriding said motor.

13. Fluid pressure responsive apparatus comprising:

a submersible vessel adapted to be disposed in a liquid and be subjected to the buoyant action of the liquid;

a diaphragm motor carried by said vessel, said motor including a flexible diaphragm, a sensing chamber at one side of the diaphragm, a setting chamber at the other side of the diaphragm, and a drive rod connected to the diaphragm;

a hydropneumatic converter means supplying air to said setting chamber at a pressure equal to a hydrostatic pressure to which said converter is exposed;

said converter means including conduit means connected at one end to a source of air at adjustable pressure which source is disposed exterior to and at a distance from said vessel and controlled remotely relative to said vessel, the other end of said conduit means being connected to said setting chamber;

said source of air at adjustable pressure including a chamber having a movable wall, said movable wall being adapted for exposure to said liquid;

said chamber having a movable wall being filled with air and communicating with said conduit means;

said chamber having a movable wall being functionally separate and distinct from said diaphragm motor and said diaphragm and chambers of said motor;

the force acting against said diaphragm in said setting chamber being constant except to the extent it is a predetermined linear function (p) of the diaphragm displacement (x) selected from the group of functions including (p) equals (ax+b) where (a) and (b) are constants one of which may be zero;

opposition means supplying at said sensing chamber a force acting in opposition to the air pressure supplied by said converter means, said opposition means being a source of pressure that is a function of the hydrostatic pressure at a member affixed to said buoyed vessel;

said motor actuating said drive rod in response to said hydrostatic pressure at said member affixed to said buoyed vessel;

diving vane means carried by said vessel and connected to said drive rod and effective when said vessel is towed in said liquid to maintain said vessel at a depth having a hydrostatic pressure equal to the pressure in said setting chamber; and a submersible cable to which said vessel is connected for towing, said converter being connected to said cable at a distance from said vessel in advance of the vessel relative to the direction of tow.

14. Combination of claim 13 including:

a second motor having a second diaphragm, a second sensing chamber at one side of the second diaphragm connected to the liquid pressure buoying said vessel, and a second setting chamber at the other side of the second diaphragm in which is mounted an adjustable spring, and a second drive rod connected to said second diaphragm; and an adjustable range and position lost motion connection connecting said drive rods.

15. Combination of claim 8, wherein said converter comprises a cylinder, a free piston in the cylinder, the chamber in the cylinder at one side of the piston being filled with air and connected to said motor, the chamber in the cylinder at the other side of the piston being filled with said liquid in which said vessel is buoyed.

16. Combination of claim 2 wherein:

said vessel is submersible;

said motor is carried by said vessel; and said opposition means includes a flexible hose connected at one end to a source of air at adjustable pressure controlled remotely relative to the vessel, said source being exterior to said vessel and at a distance therefrom, and means connecting the other end of said hose to said setting chamber.

17. Combination of claim 8 wherein:

said source of air at adjustable pressure is exterior to said vessel and located at a distance therefrom; and said conduit means by which said source of air at adjustable pressure is connected to said setting chamber includes a flexible hose.